US008194261B2

(12) United States Patent (10) Patent No.: US 8,194,261 B2
Ooshio (45) Date of Patent: Jun. 5, 2012

(54) IMAGE PROCESSING APPARATUS, METHOD FOR CONTROLLING IMAGE PROCESSING APPARATUS, CONTROL PROGRAM, AND RECORDING MEDIUM

(75) Inventor: Hideyoshi Ooshio, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/317,638

(22) Filed: Oct. 25, 2011

(65) Prior Publication Data

US 2012/0038955 A1 Feb. 16, 2012

Related U.S. Application Data

(63) Continuation of application No. 12/010,701, filed on Jan. 29, 2008, now Pat. No. 8,072,623.

(30) Foreign Application Priority Data

Feb. 16, 2007 (JP) .................................. 2007-037109
Nov. 28, 2007 (JP) .................................. 2007-307186

(51) Int. Cl.
*G06F 15/76* (2006.01)
*G06F 9/02* (2006.01)

(52) U.S. Cl. ........................ 358/1.13; 358/1.15; 358/1.2

(58) Field of Classification Search ................ 358/1.15, 358/1.13, 1.12
See application file for complete search history.

(56) References Cited

U.S. PATENT DOCUMENTS

| 5,995,712 | A | 11/1999 | Doi | |
|---|---|---|---|---|
| 7,869,072 | B2 | 1/2011 | Gong | |
| 7,969,455 | B2 | 6/2011 | Yoshida et al. | |
| 2002/0033878 | A1* | 3/2002 | Satoh et al. | 347/252 |
| 2003/0214682 | A1 | 11/2003 | Namizuka | |
| 2003/0231343 | A1* | 12/2003 | Kobayashi et al. | 358/1.16 |
| 2004/0153530 | A1 | 8/2004 | Machida | |
| 2005/0005204 | A1* | 1/2005 | Kobayashi | 714/48 |
| 2005/0117773 | A1* | 6/2005 | Kobayashi | 382/100 |

FOREIGN PATENT DOCUMENTS

| JP | H11-003212 | 1/1999 |
|---|---|---|
| JP | 2000-200187 | 7/2000 |
| JP | 2004-129246 | 4/2004 |
| JP | 2005-269619 | 9/2005 |
| JP | 2005-301968 | 10/2005 |
| JP | 2006-079211 | 3/2006 |
| JP | 2006-113968 | 4/2006 |

* cited by examiner

*Primary Examiner* — King Poon
*Assistant Examiner* — Allen H Nguyen
(74) *Attorney, Agent, or Firm* — Harness, Dickey & Pierce, P.L.C.

(57) ABSTRACT

An image processing apparatus is disclosed that includes an image processing unit section and an information processing unit section. The image processing unit section includes an image scanner that performs an image processing function and a SDK application that expands and controls the function of the image processing apparatus. The information processing unit section includes an operations panel that selectively performs operations between a basic application and the SDK application and a MFP service that transmits an instruction signal to the SDK application so as to control the image scanner in accordance with the operation on the operations panel. The information processing unit section confirms the corresponding relationship between the MFP service and the SDK application when the image processing apparatus performs a starting process and makes the SDK application correspond to the MFP service in accordance with the confirmation results.

10 Claims, 9 Drawing Sheets

IMAGE PROCESSING APPARATUS, METHOD FOR CONTROLLING IMAGE PROCESSING APPARATUS, CONTROL PROGRAM, AND RECORDING MEDIUM

CROSS-REFERENCE TO RELATED APPLICATIONS

This application is a continuation of and claims priority under 35 U.S.C. §§120/121 to U.S. patent application Ser. No. 12/010,701, filed on Jan. 29, 2008, now U.S. Pat. No. 8,072,623 which claims the benefit of Japanese priority application No. 2007-037109, filed on Feb. 16, 2007 and Japanese priority application No. 2007-307186, filed on Nov. 28, 2007. The disclosures of each of the above applications are incorporated herein by reference.

BACKGROUND OF THE INVENTION

1. Field of the Invention

The present invention relates to an image processing apparatus, a method for controlling the image processing apparatus, a control program, and a recording medium and, in particular, to confirmation of the corresponding relationship between an expansion control function that expands and controls the original function of the image processing apparatus and an expansion instruction unit that provides instructions to the expansion control function.

2. Description of the Related Art

Generally, known image processing apparatuses implement a system with two structures composed of a main body including an image forming function and an image scanning function and an IT-BOX as an information processing terminal that performs an information processing (IT: Information Technology) function. In the main body of the image processing apparatus, a SDK (Software Development Kit) application (hereinafter referred to as the SDK application) is installed as a function expansion application that responds to an image processing function of the main body to realize an expanded function. In addition, the SDK application installed in the main body is operated on the IT-BOX side to realize various information processing functions.

Such image processing apparatuses are applied to ones having facsimile machines of the same type, which are manufactured by the same company. In some image processing apparatuses, if the version of a program on the document recipient side is higher, a call is made from the facsimile machine on the document recipient side to download a program whose version is higher than the previous one. In other image processing apparatuses, if the version of a program on the document sender side is lower, a call is made from the facsimile machine on the document sender side and a new version program is uploaded from the facsimile machine on the document recipient side.

As a related art case, Patent Document 1 discloses an apparatus that includes a storage unit storing the version of a predetermined control program and a control unit that receives version data of an opposite party apparatus at the transmission or the reception of communication data and receives control program data from the opposite party apparatus to update the predetermined control program if the version stored in the storage unit is lower than that of the received data.

Patent Document 2 discloses a management system of an image processing apparatus including the image processing apparatus that performs image recording and network communications and a management server that communicates with the image processing apparatus via a network. In this system, the server includes programs that achieve the functions of the apparatus in its database. If the programs are upgraded, the server downloads them into the apparatus using the network. The server upgrades the apparatus either automatically or at the reception of an approval reply from the apparatus after transmitting upgrade information to the line number or the e-mail address registered for the apparatus via the network.

Patent Document 3 discloses an image forming apparatus adapted to be capable of installing applications. This apparatus includes an application information acquisition unit that acquires application information used for determining if it is possible to install applications in the apparatus.

Patent Document 4 discloses a printer driver supply unit including a common printer driver common to plural printers and a model-dependent printer driver inherent in a predetermined printer. Specifically, the common printer driver is adapted to be installed in a personal computer at the first connection with the personal computer, and the model-dependent printer driver is adapted to be installed at the first and the following connections with the personal computer and adapted to be uninstalled at the disconnection from the personal computer.

Patent Document 5 discloses an image forming apparatus including a platform that manages applications. This apparatus includes as an application managed by the platform an operations screen display application that displays an operations screen on which other applications managed by the platform are to be operated.

Patent Document 6 discloses an image forming apparatus including a transfer unit that transfers to a terminal device of the apparatus Web applications such as Applets, Xlets, and standalone applications and an application having an absorption function. Specifically, the Web applications display an operations screen for performing operations on the screen of the terminal device of the apparatus, and the absorption function absorbs the difference between a start function that starts the Web applications in the terminal device and an execution environment.

Patent Document 7 discloses an information processing apparatus including a storage medium setting unit to which a storage medium is set. The apparatus includes a validity determination unit that determines the validity of a program based on the validity of validity determination data in the storage medium storing the program and the validity determination data. The validity determination unit determines the validity of the validity determination data based on the verification of a hash code generated from the program with that obtained by decoding the validity determination data and the verification of data inherent in the information processing apparatus with that obtained by decoding the validity determination data.

Patent Document 1: JP-A-11-3212
Patent Document 2: JP-A-2000-200187
Patent Document 3: JP-A-2004-129246
Patent Document 4: JP-A-2006-113968
Patent Document 5: JP-A-2005-269619
Patent Document 6: JP-A-2006-79211
Patent Document 7: JP-A-2005-301968

SUMMARY OF THE INVENTION

The present invention has been made in order to improve the combination between an expansion control unit and an expansion instruction unit and may provide an information processing apparatus that realizes a system with two structures composed of an image processing apparatus main body and an information processing terminal for realizing an information processing function so as to prevent problems due to the corresponding relationship between a function expansion application installed in the image processing apparatus main body and an operational program for operating the application that is included in the information processing terminal.

In order to solve the problems, according to an aspect of the present invention, there is provided an image processing apparatus having a first block and a second block that expands a function of the first block. In the image processing apparatus, the first block comprises an image processing unit that performs at least one image processing function among an image forming function and an image scanning function; a basic control unit that controls the image processing unit as a function initially installed in the image processing apparatus; an expansion control unit that expands the function of the image processing apparatus and controls the image processing unit; and a first basic communication unit that exchanges information at least between the basic control unit and the second block. Furthermore, the second block comprises an operations unit that is capable of selectively performing operations between the basic control unit and the expansion control unit; a second basic communication unit that exchanges information between the operations unit and the first block; an expansion instruction unit that transmits an instruction signal to the expansion control unit so as to control the image processing unit in accordance with an operation on the operations unit; an expansion function correspondence confirmation unit that confirms the corresponding relationship between the expansion instruction unit and the expansion control unit when the image processing apparatus performs a starting process; and an expansion control update unit that makes the expansion control unit correspond to the expansion instruction unit in accordance with a confirmation result of the expansion function correspondence confirmation unit.

According to another aspect of the present invention, the image processing apparatus further comprises an expansion communication unit that exchanges information between the expansion instruction unit and the expansion control unit.

According to still another aspect of the present invention, the expansion communication unit is capable of transmitting a larger amount of information per unit of time than the first and second basic communication units.

According to still another aspect of the present invention, the operations unit includes a display section that visually displays information and a detection section that detects an operation by a user relative to the display section, displays information corresponding to the basic control unit on the display section when operating the basic control unit, and displays information corresponding to the expansion control unit on the display section when operating the expansion control unit.

According to still another aspect of the present invention, the operations unit acquires the information corresponding to the basic control unit from the basic control unit via the first and second basic communication units and the information corresponding to the expansion control unit from the expansion instruction unit.

According to still another aspect of the present invention, the operations unit overwrites information acquired from the expansion control unit via the first and second basic communication units with the information corresponding to the expansion control unit so as to be displayed on the display section when operating the expansion control unit.

According to still another aspect of the present invention, the operations unit includes a voice input section to which voice information is input, and the expansion instruction unit transmits the instruction signal in accordance with voice input to the voice input section.

According to still another aspect of the present invention, the expansion instruction unit stores operations information to be output in accordance with the operation by a user to the operations unit and information about an instruction signal to be transmitted to the expansion control unit so as to be associated with each other.

According to still another aspect of the present invention, there is provided a method for controlling an image processing apparatus having a first block and a second block that expands a function of the first block. In the image processing apparatus, the first block comprises an image processing unit that performs at least one image processing function among an image forming function and an image scanning function; a basic control unit that controls the image processing unit as a function initially installed in the image processing apparatus; an expansion control unit that expands the function of the image processing apparatus and controls the image processing unit; and a first basic communication unit that exchanges information at least between the basic control unit and the second block. Furthermore, the second block comprises an operations unit that is capable of selectively performing operations between the basic control unit and the expansion control unit; a second basic communication unit that exchanges information between the operations unit and the first block; and an expansion instruction unit that transmits an instruction signal to the expansion control unit so as to control the image processing unit in accordance with an operation to the operations unit. The method comprises the steps of confirming the corresponding relationship between the expansion instruction unit and the expansion control unit when the image processing apparatus performs a starting process; and making the expansion control unit correspond to the expansion instruction unit in accordance with a confirmation result of the above step.

According to still another aspect of the present invention, there is provided a recording medium having recorded therein a control program, which causes an information processing apparatus to perform the method described above, in a form readable by the information processing apparatus.

The embodiments of the present invention provide an information processing apparatus that realizes a system with two structures composed of an image processing apparatus main body and an information processing terminal for realizing an information processing function so as to prevent problems due to the corresponding relationship between a function expansion application installed in the image processing apparatus main body and an operational program for operating the application that is included in the information processing terminal.

Other objects, features and advantages of the present invention will become more apparent from the following detailed description when read in conjunction with the accompanying drawings.

DETAILED DESCRIPTION OF THE PREFERRED EMBODIMENTS

Next, a description is specifically made of embodiments of the present invention with reference to the accompanying drawings.

The embodiments are applied to a digital color complex machine as an example of an image processing apparatus, a so called MFP (Multi Function Peripheral) in which are integrated a copy function, a facsimile (FAX) function, a print function, a scanner function, a distribution function that distributes input images (the document images scanned by the scanner function and the images input by the copy function or the facsimile function), and the like.

Figure 1:
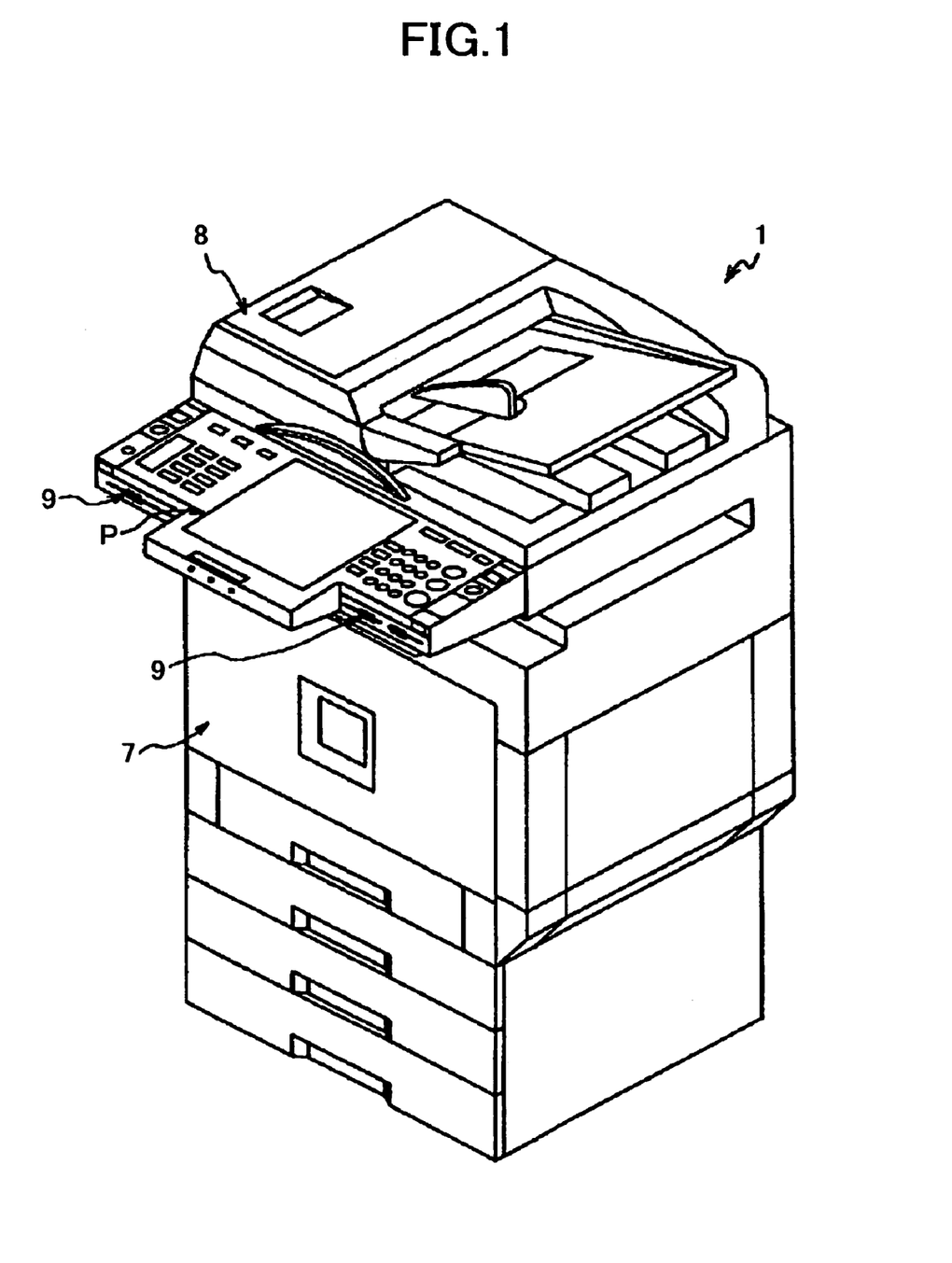
FIG. 1 is a perspective view showing a digital color complex machine according to embodiments of the present invention.

FIG. 1 is an external perspective view schematically showing the digital color complex machine as the image processing apparatus to which the embodiments of the present invention are applied. As shown in FIG. 1, the digital color complex machine 1 has an image scanner 8 as an image scanning unit that scans images from a document on the upper side of a printer 7 as an image forming unit that forms images on a medium such as transfer paper. Furthermore, at the external surface of the image scanner 8 is provided an operations panel P that offers an operator a display and allows the operator to make various inputs such as function settings. At the lower side of the operations panel P is provided an external medium input/output device 9 that reads program code stored in a storage medium M or writes program code, image data, and the like in the storage medium M, in such a manner as to expose to the outside the inserting ports where the insertion of the storage medium M is allowed.

Figure 2:
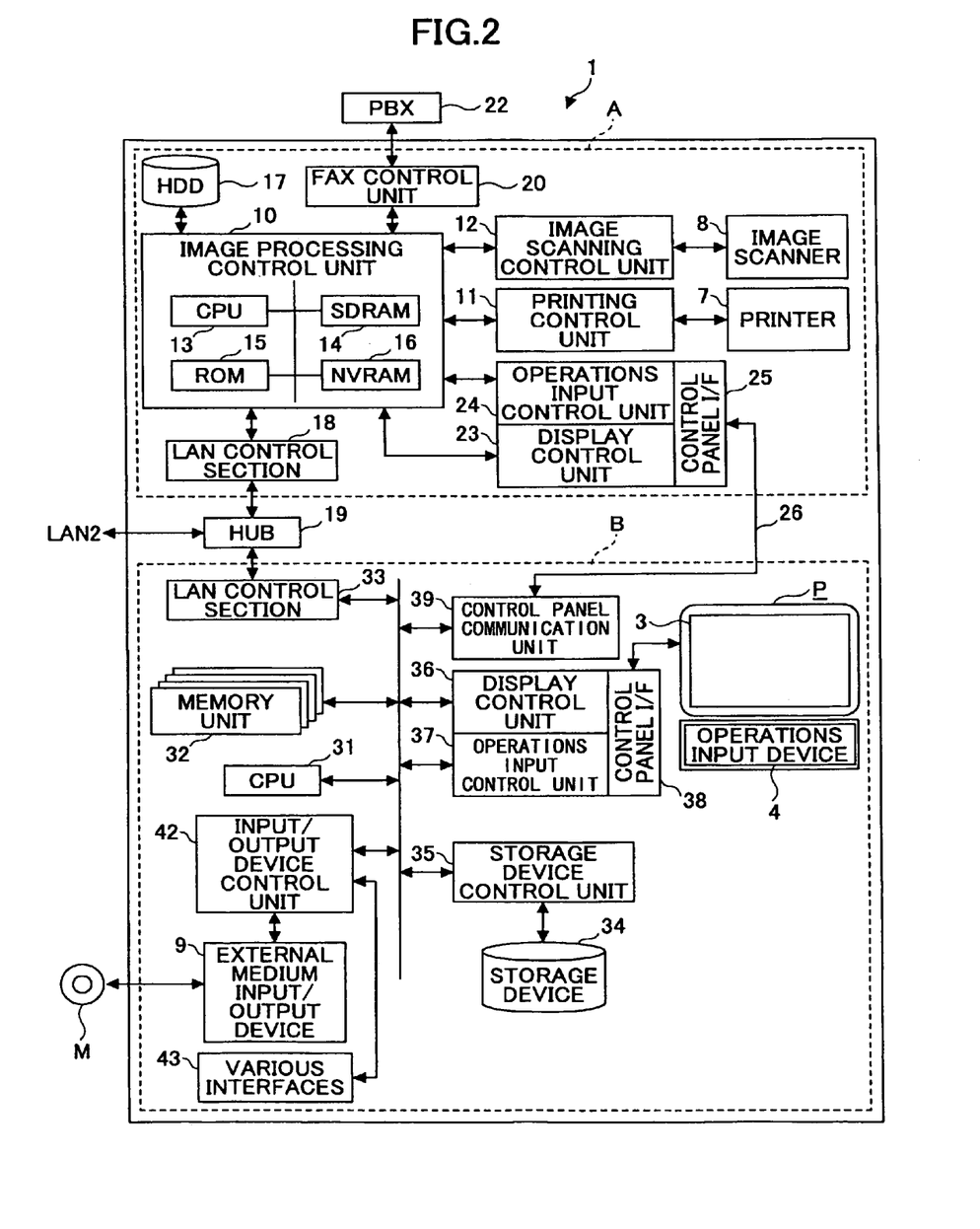
FIG. 2 is a block diagram showing the configuration of the digital color complex machine according to the embodiments of the present invention.

FIG. 2 is a block diagram showing the inside of the digital color complex machine shown in FIG. 1. As shown in FIG. 2, the inside of the digital color complex machine is roughly divided into an image processing unit section A as a first block and an information processing unit section B as a second block. The printer 7 and the image scanner 8 belong to the image processing unit section A. On the other hand, the operations panel P and the external medium input/output device 9 belong to the information processing unit section B. Note that inside the digital color complex machine the image processing unit section A serves as the MFP and the information processing unit section B serves as an IT machine (i.e., IT-BOX that realizes information technology functions). In other words, the information processing unit section B is provided to expand the function of the image processing unit section A.

First, the image processing unit section A is described. The image processing unit section A, which is initially provided with the printer 7 and the image scanner 8, includes an image processing control unit 10 that controls all the image processing in the image processing unit section A. The image processing control unit 10 is connected to a printing control unit 11 that controls the printer 7 and an image scanning control unit 12 that controls the image scanner 8.

The printing control unit 11 outputs printing instructions including image data to the printer 7 in accordance with the control by the image processing control unit 10, thereby causing the printer 7 to form and output images on a medium such as a transfer paper. The image scanning control unit 12 drives the image scanner 8 under the control of the image processing control unit 10, the image scanner 8 scans reflected light of lamp irradiation with respect to the front surface of a document by condensing it on a light receiving element (for example, a CCD (Charge Coupled Device)) through a mirror and a lens, and applies A/D conversion to analog digital data produced by the CDC so as to generate digital image data in eight-bit color of each RGB.

The image processing control unit 10 is composed of a microcomputer in which a CPU (Central Processing Unit) 13 as a main processor, a memory device (for example, SDRAM (Synchronous Dynamic Random Access Memory)) 14 where the image data read out from the image scanner 8 are temporarily stored to be used for image formation by the printer 7, a ROM (Read Only Memory) 15 where control programs and the like are stored, and a NVRAM (Nonvolatile Random Access Memory) 16 that stores system logs, system settings, log information, and the like and is capable of holding data even when the power is turned off. These components are connected to one another through a bus.

Furthermore, the image processing control unit 10 is connected to a HDD (Hard Disk Drive) 17 as a storage device that accumulates a large amount of image data, job history, and the like; a LAN control section 18 that connects the image processing unit section A to the LAN 2 via a HUB 19 as a line concentrator that is provided in the digital color complex machine; and a FAX control unit 20 that controls facsimile transmission/reception. The FAX control unit 20 is connected to a PBX (Private Branch Exchange) 22 communicating with a public telephone network (not shown). Thus, the digital color complex machine 1 is capable of communicating with remote facsimile machines.

In addition, the image processing control unit 10 is connected to a display control unit 23 and an operations input control unit 24. The display control unit 23 outputs an image display control signal to the information processing unit section B via a communication cable 26 connected to a control panel I/F 25 under the control of the image processing control unit 10, thereby controlling the image display relative to the operations panel P of the information processing unit section B.

Furthermore, the operations input control unit 24 inputs an input control signal corresponding to function settings and input operations by an operator through the operations panel P of the information processing unit section B via the communication cable 26 connected to the control panel I/F 25 under the control of the image processing control unit 10. In other words, the image processing unit section A is capable of directly monitoring the operations panel P of the information processing unit section B via the communication cable 26.

Thus, the image processing unit section A is configured to have the communication cable 26 connected to the image processing unit of a conventional image processing apparatus so as to use the operations panel P of the information processing unit section B. In other words, the display control unit 23 and the operations input control unit 24 of the image processing unit section A are connected to the operations panel P. With these configurations, the image processing unit section A analyzes print data and print commands as image information from the outside (the server computer, the client computers, the facsimile machine, and the like) via the LAN 2, develops as output image data the print data into bitmap data so as to be printed, and analyzes a print mode based on the commands to determine its operation. The image processing unit section A receives the print data and the commands via the LAN control section 18 or the FAX control unit 20 to operate.

The image processing unit section A is capable of transferring to the outside (the server computer, the client computers, the facsimile machine, and the like) print data, scanned document data, output image data processed for output, and compressed data thereof, which are stored in the SDRAM 14 and the HDD 17.

Next, the information processing unit section B including the operations panel B is described. The information processing unit section B is composed of a microcomputer controlled by a universal OS (Operating System) for use in an information processing apparatus generally called a personal computer. The information processing unit section B includes a CPU 31 as a main processor, and the CPU 31 is connected to a memory unit 32 and a storage device control unit 35 through a bus. The memory unit 32 is composed of a RAM as a work area for the CPU 31 and a ROM storing a boot program and the like. The storage device control unit 35 controls input/output of data to/from the storage device 34 such as a HDD storing an OS and application programs.

Furthermore, the CPU 31 is connected to a LAN control section 33 that connects the information processing unit section B to the LAN 2 via the HUB 19. The IP address as a network address allocated to the LAN control section 33 is different from that allocated to the LAN control section 18 of the image processing unit section A.

In other words, two IP addresses are allocated to the digital color complex machine 1 of the embodiments. That is, the LAN 2 is connected to each of the image processing unit section A and the information processing unit section B, thereby making it possible for the LAN 2 to exchange data between the information processing unit sections A and B. Moreover, the CPU 31 is connected to the display control unit 36 and the operations input control unit 37 that control the operations panel P.

Figure 3:
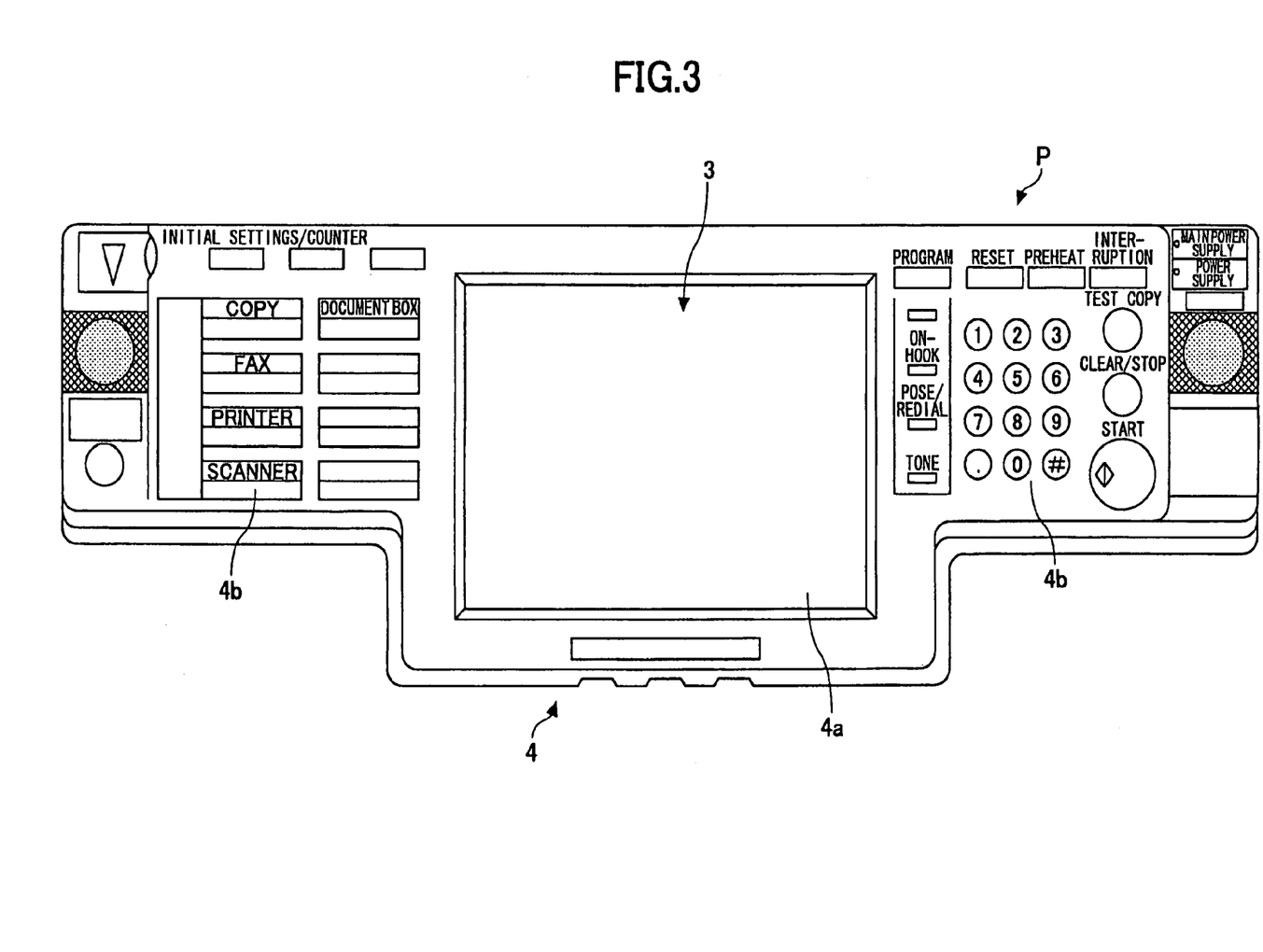
FIG. 3 is a plan view showing an operations panel of the digital color complex machine according to the embodiments of the present invention.

FIG. 3 is a plan view showing the configuration of the operations panel P. As shown in FIG. 3, the operations panel P is composed of a display device 3 such as a LCD (Liquid Crystal Display) and an operation input device 4. The operation input device 4 is composed of a touch panel 4a of an ultrasonic elastic wave system or the like that is laminated on the front surface of the display device 3 and a keyboard 4b having plural keys. In other words, the operations panel P includes a display section that visually displays information and a detection section that detects the operations by the user relative to the display section. The keyboard 4b is provided with a start key to start image scanning, a numeric keypad to input numbers, a scanning condition setting key to set the destination of scanned image data, a clear key, and the like.

In other words, the display control unit 36 outputs an image display control signal to the display device 3 via the control panel I/F 38 and causes the display device 3 to display given images in accordance with the image display control signal. An operations section is composed of operations buttons on the screen displayed on the touch panel 4a and a keyboard 4b. On the other hand, the operations input control unit 37 receives an input control signal in accordance with function settings and inputting operations by an operator through the operations input device 4 via the control panel I/F 38.

In addition, the CPU 31 is connected to a control panel communication unit 39 connected to the control panel 25 of the image processing unit section A via the communication cable 26. The control panel communication unit 39 receives the image display control signal output from the image processing unit section A. Furthermore, the control panel communication unit 39 transfers an input control signal in accordance with function settings and inputting operations by an operator through the operations panel P to the image processing unit section A. In other words, the control panel I/F 25 exchanges information with the information processing unit section B, and the control panel communication unit 39 exchanges information with the image processing unit section A.

As described, in detail below, the image display control signal from the image processing unit section A received at the control panel communication unit 39 is subjected to a data conversion process for the display device 3 of the operations panel P and output to the display control unit 36. The input control signal in accordance with function settings and inputting operations by an operator through the operations panel P is subjected to a data conversion process to suit the specifications of the image processing unit section A and input to the control panel communication unit 39.

As described above, the storage device 34 stores an OS and application programs performed by the CPU 31. In this sense, the storage device 34 functions as a storage medium to store application programs.

In the digital color complex machine 1, when the user turns on the power, the CPU 31 starts the boot program of the memory unit 32, reads the OS from the storage device 34 into the RAM of the memory unit 32, and starts the OS. The OS starts programs, reads and stores information in accordance with the operations by the user. As a typical OS, Windows (Trade Mark), for example, is known. Operation programs running on such an OS are called application programs. The OS of the information processing unit section B may the same as that of information processing apparatuses (such as the server computer and the client computers), namely, a universal OS (for example, Windows (Trade Mark)).

Figure 4:
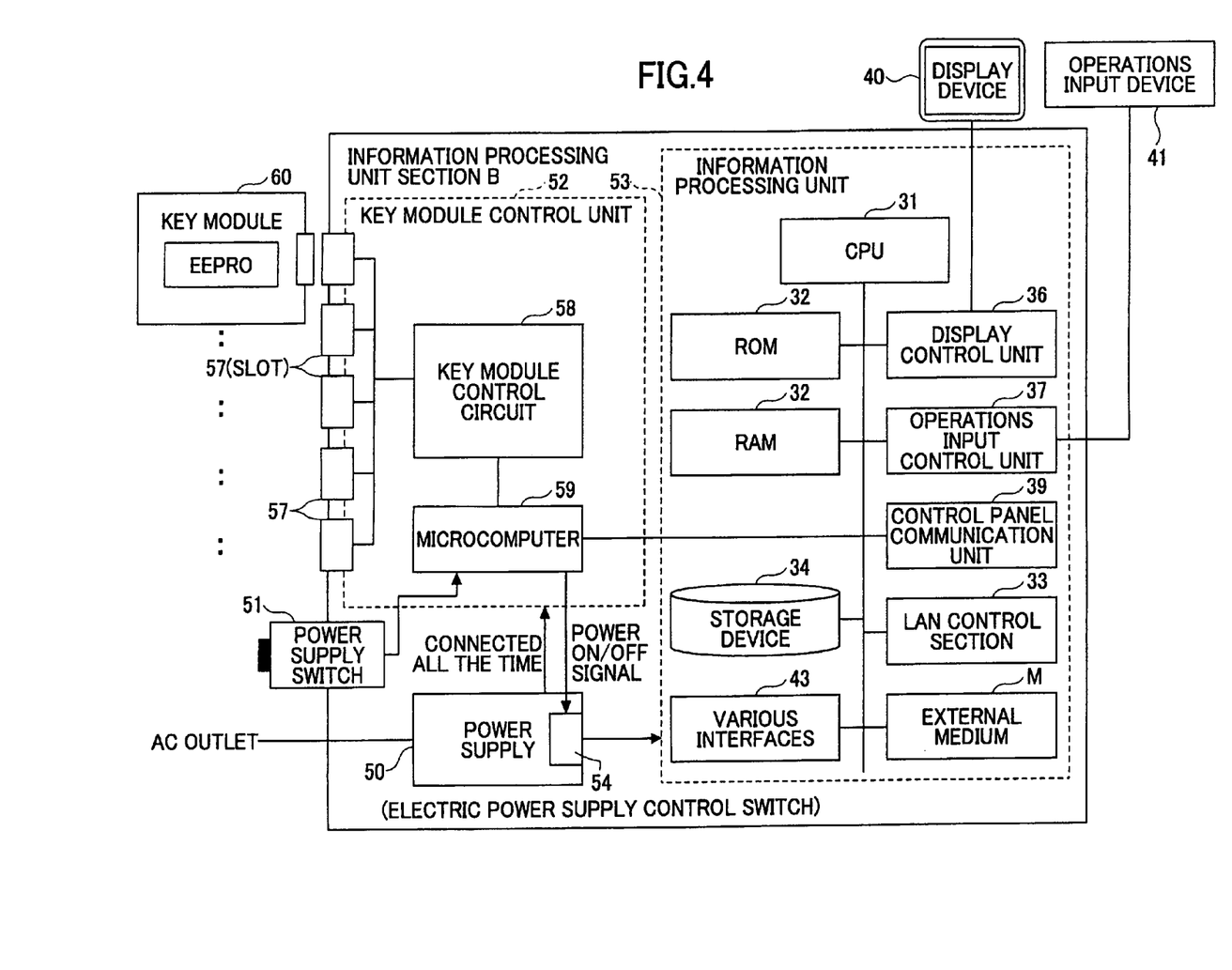
FIG. 4 is a block diagram showing an ID-key connection part according to the embodiments of the present invention.

FIG. 4 is a block diagram showing the configuration of an ID-key connection part in the information processing unit section B. As shown in FIG. 4, the information processing unit section B is composed of a power supply 50, a power supply switch 51, a key module control unit 52, and an information processing unit 53. The power supply 50 supplies electric power to both of the key module control unit 52 and the information processing unit 53, and the key module control unit 52 receives the electric power from the power supply 50 all the time. On the other hand, the supply of the electric power from the power supply 50 to the information processing unit 53 is controlled by an electric power supply control switch 54.

The key module control unit 52 is composed of plural slots 57 that establish connection with a key module 60, a key module control circuit 58, and a microcomputer 59. The key module control circuit 58 manages connection information as to which one of the slots 57 the key module 60 is connected to, and controls the input/output of option data to/from an EEPROM in the connected key module 60. Note that the key module control circuit 58 or the bus for connecting the key module control circuit 58 and the slots 57 to each other is structured so that writing is permitted only in a specific address of the EEPROM in the key module 60.

The microcomputer 59 outputs a power-on signal or a power-off signal to the electric power supply control switch 54 in the power supply 50 based on the signals output from the power supply switch 51 and the key module control circuit 58 and the status of the information processing unit 53.

The information processing unit 53 is composed of a microcomputer controlled by a universal OS for use in an information processing apparatus generally called a personal computer. The information processing unit 53 includes the CPU 31 as a main processor, and the CPU 31 is connected to the memory unit 32 and a storage device 34 through a bus. The memory unit 32 is composed of a RAM as a work area for the CPU 31 and a ROM storing a boot program and the like. Furthermore, the CPU 31 is connected to the LAN control section 33 that connects the information processing unit 53 to the LAN.

Figure 5:
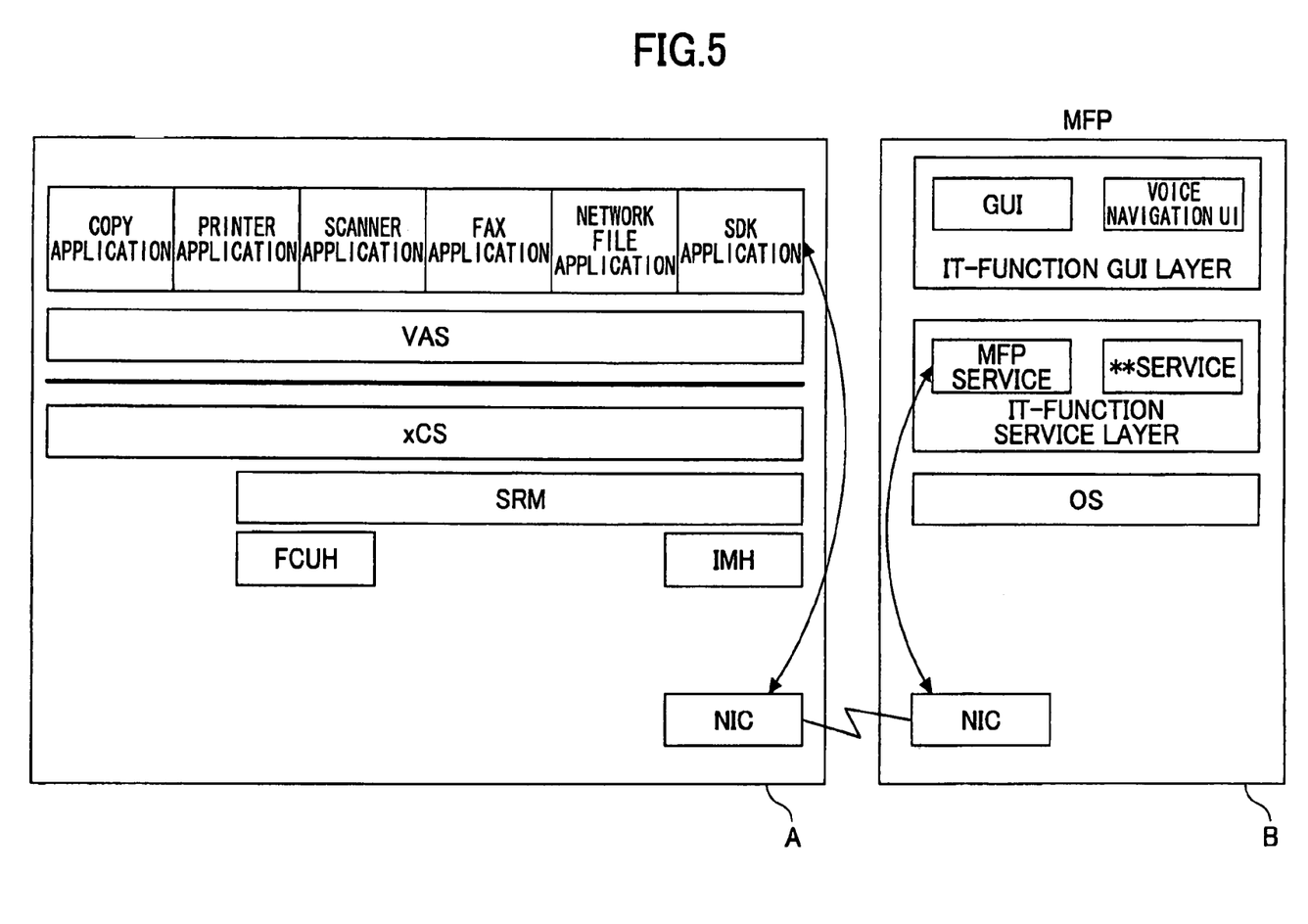
FIG. 5 is a diagram showing the software configuration of the digital color complex machine according to the embodiments of the present invention.

Referring next to FIG. 5, a description is made of a program configuration of the digital color complex machine shown in FIG. 1. As shown in FIG. 5, when a main power supply is turned on, the image processing unit section A as the MFP main body is started and then a SDK application as an application developed by an exclusive SDK (Software Development Kit) is started. The SDK application is loaded into the SDRAM 14 shown in FIG. 2 and operated by the control of the CPU 13. The SDK application expands and controls the function of a digital color complex machine and serves as an expansion control unit.

Furthermore, the information processing unit section B as the IT machine is activated to start a MFP service as well. The SDK application and the MFP service perform communications using TCP/IP via a network board (NIC). In the configuration shown in FIG. 2, the MFP service and the SDK application exchange information via the LAN control section 18, the HUB 19, and the LAN control section 33. In other words, the LAN control section 18, the HUB 19, and the LAN control section 33 serve as an expansion communication unit. The MFP service has a function of transmitting an instruction signal from the information processing unit section B to the SDK application. In other words, the MFP service serves as an expansion instruction unit that transmits instructions to the expansion control unit. Accordingly, the MFP service stores the operations information input by the user through the operations panel P and the instruction signal for controlling the SDK application so as to be associated with each other, and outputs the instruction signal involved.

As shown in FIG. 5, the image processing unit section A loads software programs such as a copy application, a printer application, a scanner application, a FAX application, and a network file application into the SDRAM 14 so as to be executed in the same manner as the SDK application. As a function initially installed in the digital color complex machine, these software programs serve as a basic control unit that controls the image scanning control unit 12, the printing control unit 11, and the like. Note that the instructions to these software programs are input by signals corresponding to the operation by the user through the operations panel P via the control panel communication unit 39, the communication cable 26, and the control panel I/F 25. In other words, the control panel I/F 25 and the control panel communication unit 39 serve as first and second basic communication units, respectively.

When operating the digital color complex machine via the operations panel P, the user transmits the instruction signal to either the expansion control unit or the basic control unit. The user switches a subject that receives the instruction signal by operating the touch panel 4a or the keyboard 4b. As for the transmission of the instruction signal to the expansion control unit, the touch panel 4a is configured to have a GUI (Graphical User Interface) so as to transmit the instruction signal to the SDK application based on the information acquired from the MFP service.

On the other hand, as for the transmission of the instruction signal to the basic control unit, the touch panel 4a is configured to have a GUI so as to transmit the instruction signal to the basic control unit based on the information acquired from the basic control unit. More specifically, the user operates the operations panel P to select any of the copy application, the printer application, the scanner application, the FAX application, the network file application, and the SDK application, thereby displaying the GUI corresponding to the selected application on the touch panel 4a. At this time, the display information corresponding to the selected application is output from the control panel I/F 25. Then, the control panel communication unit 39 receives the display information to display the GUI on the touch panel 4a. When the SDK application is selected, dummy information is output from the control panel I/F 25. The screen displayed on the touch panel 4a in response to the dummy information is a white screen. At this time, an IT-function GUI layer displays the screen of the display information acquired from the MFP service on the white screen.

It is also possible for the MFP service and the SDK application to exchange information with each other via the basic communication unit such as the control panel communication unit 39, the communication cable 26, and the control panel I/F 25. However, although a relatively large amount of information such as image information is exchanged between the MFP service and the SDK application, the basic communication unit is designed to exchange display information for the operations panel P and commands. Therefore, the amount of information that the basic communication unit can exchange per unit of time is relatively small, thereby degrading the performance of the apparatus operations. On the other hand, the expansion communication unit can exchange a larger amount of information per unit of time than the basic communication unit, thus making it possible to address such a problem.

Figure 6:
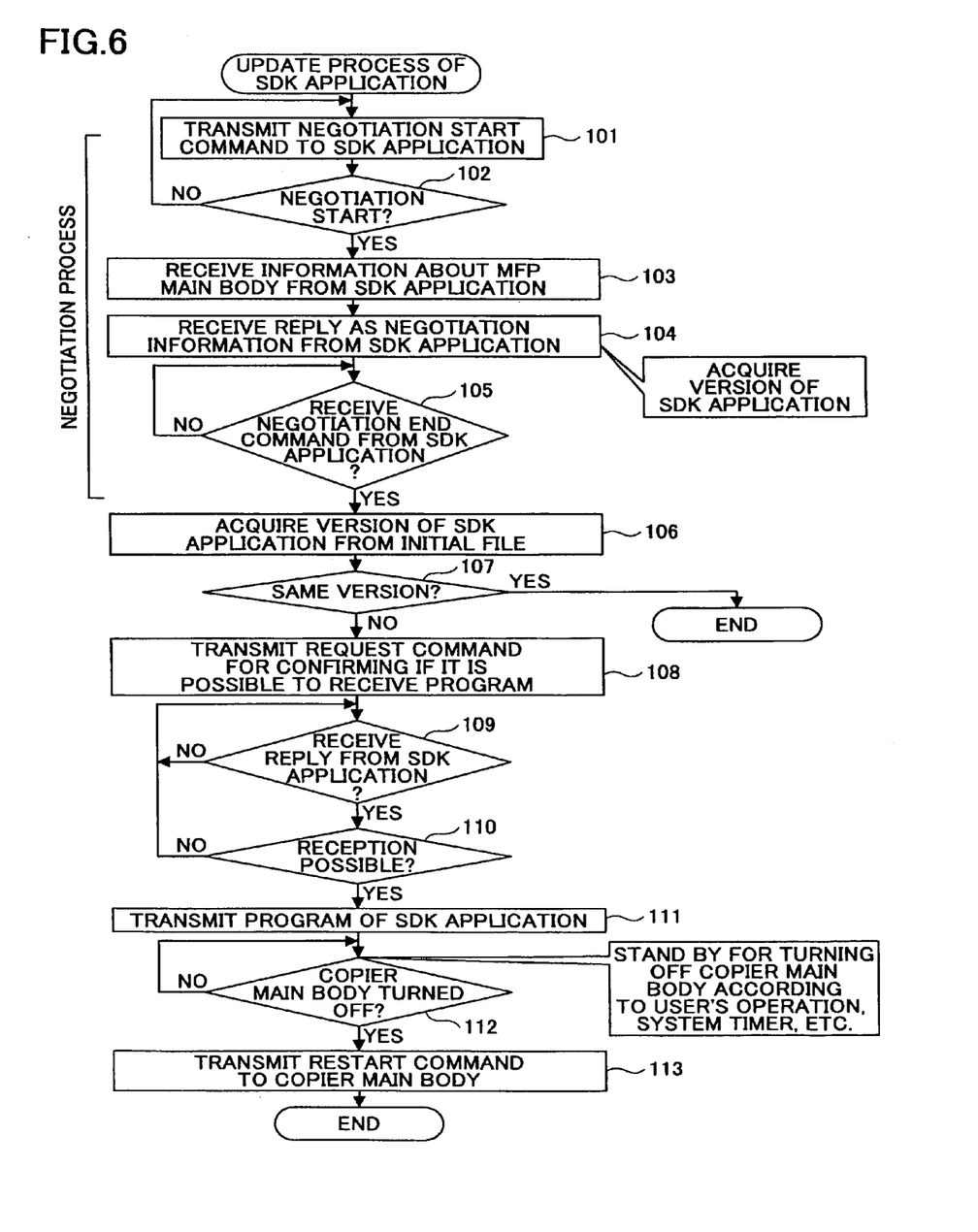
FIG. 6 is a flowchart showing an update process of a SDK application in the digital color complex machine according to one embodiment of the present invention.

Referring next to FIG. 6, a description is made of an update process (first embodiment) of the SDK application in the digital color complex machine shown in FIG. 1. FIG. 6 is a flowchart of the update process (first embodiment) of the SDK application in the digital color complex machine shown in FIG. 1. First, in step 101 of FIG. 6, the MFP service transmits a negotiation start command (a unique command for synchronization of the start) to the SDK application. If a communication error occurs between the MFP service and the SDK application, or if no response is received from the SDK application, the MFP service transmits the negotiation start command again after a predetermined time elapses (step 102).

Upon receipt of the negotiation start command, the SDK application transmits as negotiation information its version information together with the machine information received from the MFP main body. When all the information about the negotiation is transmitted, the SDK application transmits a negotiation end command to the MFP service (steps 103 and 104). Upon receipt of the negotiation end command, the MFP service determines that the negotiation has been ended and then proceeds to the next process (step 105).

Note that the software programs constituting the MFP service are stored in the storage device (HDD) 34. The software programs of the MFP service include an initial file (text file) listing the execution file and the version number of a corresponding SDK application. Accordingly, the MFP service can recognize the version of the corresponding SDK application by reading the content of the initial file.

Then, the MFP service reads the initial file of the SDK application to acquire information about the version (step 106) and compares the version thus acquired with the version received at the negotiation (step 107). In other words, the MFP service serves as an expansion function correspondence confirmation unit that confirms the corresponding relationship between the MFP service and SDK application. If these two versions are the same, the MFP service ends the update process of the SDK application without executing further processing.

If the versions are different from each other due to, for example, upgrading the version of the IT function, the MFP service transmits to the SDK application a request for confirming if it is possible to receive a program (to confirm the status on the recipient side so as to transmit a program file) (step 108). Upon receipt of a reply from the SDK application indicating that the reception is possible (steps 109 and 110), the MFP service reads out the SDK application from the HDD to start a file transmission process, thereby upgrading the version of the SDK application (step 111). Specifically, if the version of the IT function has been changed, the version of the SDK application is automatically changed so as to correspond to the combination with the IT function, thereby preventing an inconsistent combination between the SDK application and the MFP service. In other words, the MFP service serves as an expansion control update unit.

Here, since the version of the SDK application received from the MFP service will not be started unless the MFP main body is restarted, it is necessary to restart the MFP main body. Then, the MFP service confirms, based on the command received from the SDK application, whether the MFP main body is turned off according to a user's operation, a system timer, or the like (step 112). If the MFP main body is turned off, the MFP service transmits a restart command to an SCS that manages the MFP main body so as to restart the MFP main body (step 113).

Up until now, service persons are required to manually upgrade the version of the IT function using a DVD and that of the SDK application at the site of clients. However, according to the first embodiment of the present invention, it is only necessary to upgrade the version of the IT function using a DVD. That is, since the version of the SDK is automatically upgraded, it is possible to prevent human errors such as forgetting to upgrade the version of the SDK application. Moreover, it is not necessary to manually upgrade the version of the SDK application, thereby making it possible to reduce the machine time.

Figure 7:
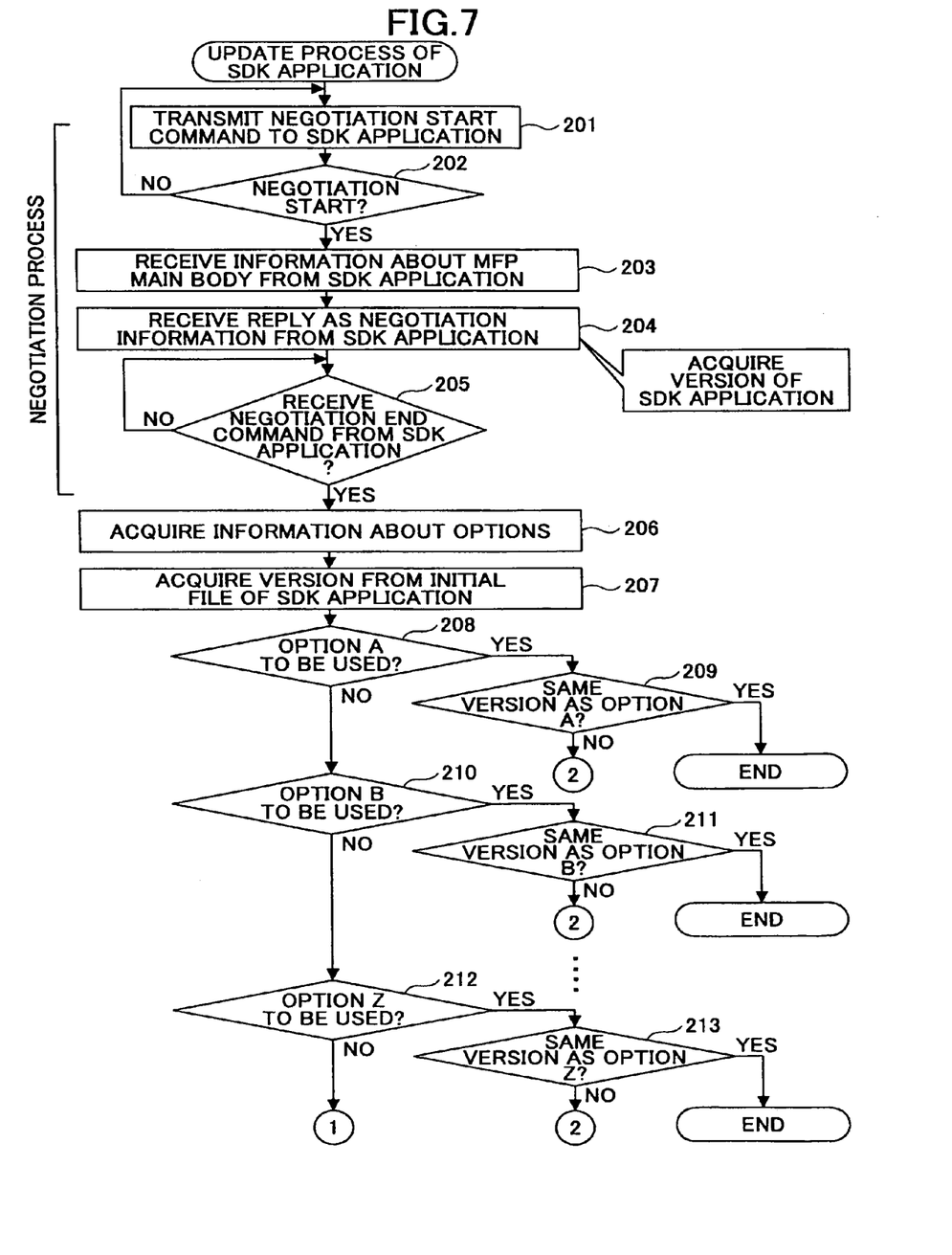
FIG. 7 is a flowchart showing an update process of the SDK application in the digital color complex machine according to another embodiment of the present invention.
Figure 8:
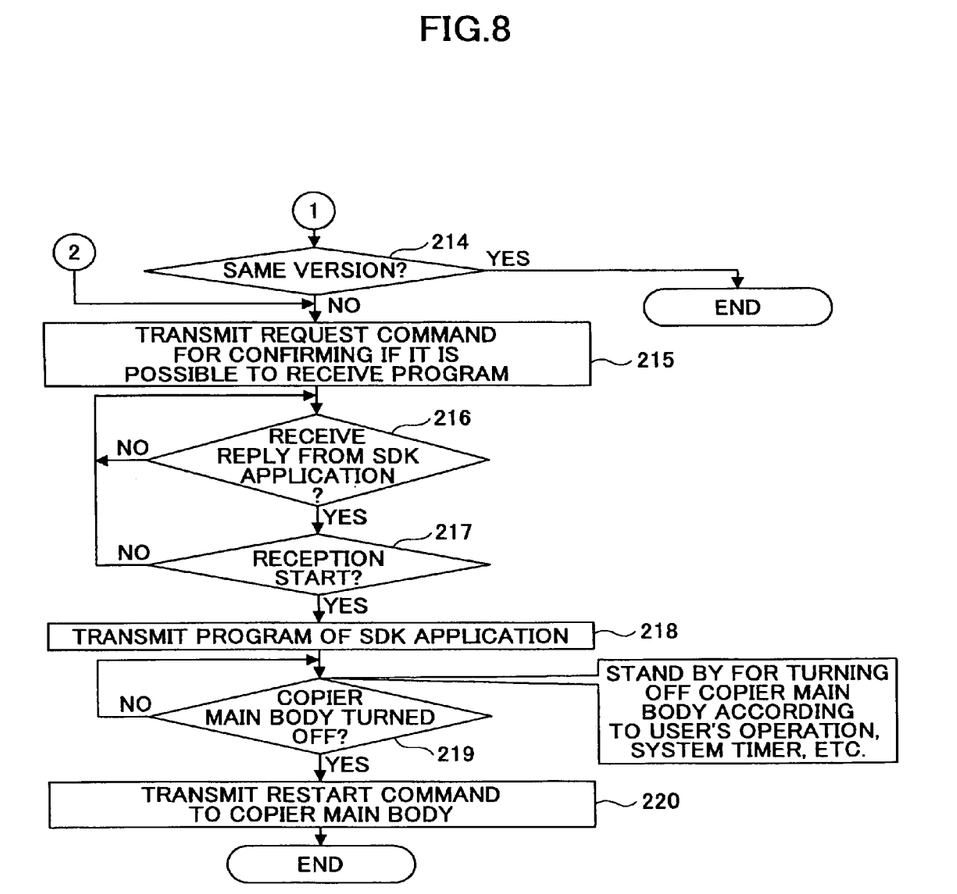
FIG. 8 is a flowchart showing an update process of the SDK application in the digital color complex machine according to another embodiment of the present invention.

Referring next to FIGS. 7 and 8, a, description is made of an update process (second embodiment) of the SDK application in the digital color complex machine shown in FIG. 1. FIGS. 7 and 8 are flowcharts of the update process (second embodiment) of the SDK application in the digital color complex machine shown in FIG. 1. In the case of the second embodiment, the key module 60 is connected to the IT function so as to select options as shown in FIG. 4. Accordingly, the options are made available. In this case, the MFP service acquires information about the options connected to the IT function and recognizes the required version of the SDK application to suit the options.

Specifically, in step 201 of FIG. 7, the MFP service transmits a negotiation start command (a unique command for synchronization of the start) to the SDK application. If a communication error occurs between the MFP service and the SDK application, or if no response is received from the SDK application, the MFP service transmits the negotiation start command again after a predetermined time elapses (step 202).

Upon receipt of the negotiation start command, the SDK application transmits as negotiation information its version information together with the machine information received from the MFP main body. When all the information about the negotiation is transmitted, the SDK application transmits a negotiation end command to the MFP service (steps 203 and 204). Upon receipt of the negotiation end command, the MFP service determines that the negotiation has been ended (step 205) and then acquires the information about the options connected to the IT function from the key module 60 (see FIG. 4) (step 206).

As for the SDK application necessary for the IT function, an initial file (text file) listing the execution file and the version number of the SDK application is stored in the HDD connected to the IT function. Accordingly, the MFP service can recognize the required version of the SDK application by reading the content of the initial file.

Then, the MFP service reads the initial file of the SDK application to acquire information about the version (step 207) and compares the version of the SDK application received at the negotiation with the required version of the SDK application to suit the options. If these two versions are the same, the MFP service ends the update process of the SDK application without executing further processing (steps 208 through 213 in FIG. 7 and step 214 in FIG. 8).

If the versions are different from each other, the MFP service transmits to the SDK application a request for confirming if it is possible to receive a program (step 215). Upon receipt of a reply from the SDK application indicating that the reception is possible, the MFP service reads out the SDK application from the HDD to start a file transmission process, thereby upgrading the version of the SDK application (steps 216, 217, and 218). Specifically, if the version of the IT function has been changed, the version of the SDK application is automatically changed to the required version to suit the options so as to correspond to the combination with the IT function, thereby preventing an inconsistent combination between the SDK application and the MFP service.

Here, since the version of the SDK application received from the MFP service will not start unless the MFP main body is restarted, it is necessary to restart the MFP main body. Then, the MFP service confirms, based on the command received from the SDK application, whether the MFP main body is turned off according to a user's operation, a system timer, or the like (step 219). If the MFP main body is turned off, the MFP service transmits a restart command to an SCS that manages the MFP main body so as to restart the MFP main body (step 220).

Up until now, service persons are required to manually upgrade the version of the IT function using a DVD and that of the SDK application to suit the options at the site of clients. However, according to the second embodiment of the present invention, it is only necessary to upgrade the version of the IT function using a DVD. That is, since the version of the SDK is automatically upgraded without becoming aware of the connected options, it is possible to prevent human errors such as forgetting to upgrade the version of the SDK application and having the inconsistent versions. Moreover, it is not necessary to manually upgrade the version of the SDK application, thereby making it possible to reduce the machine time.

Figure 9:
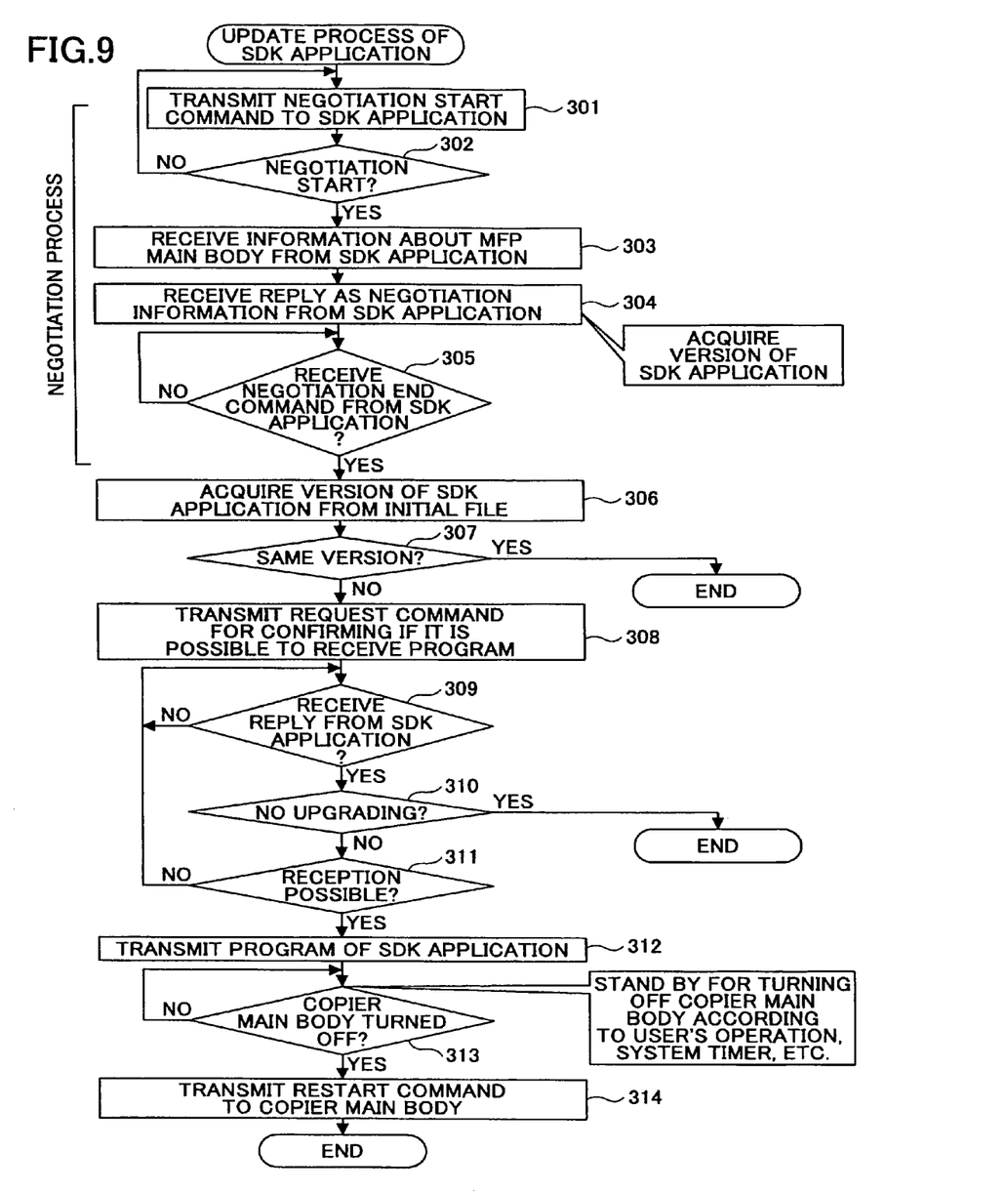
FIG. 9 is a flowchart showing an update process of the SDK application in the digital color complex machine according to another embodiment of the present invention.

Referring next to FIG. 9, a description is made of an update process (third embodiment) of the SDK application in the digital color complex machine shown in FIG. 1. FIG. 9 is a flowchart showing the update process (third embodiment) of the SDK application in the digital color complex machine shown in FIG. 1. According to the third embodiment of the present invention, the SDK application is replaced through the installation function of the MFP main body, and then the upgrading of the SDK application is set to "no automatic upgrading" in the initial setting of the SDK application. Specifically, where the SDK application is automatically replaced, it is desired to use a different version of the SDK application intentionally depending on situations. In order to deal with this, the SDK application is manually installed so that an inconsistent combination between the SDK application and the MFP service is made possible. In short, the SDK application is so designed that its version is not automatically upgraded to enable establishing an inconsistent combination between the SDK application and the MFP service.

First, in step 301 of FIG. 9, the MFP service transmits a negotiation start command (a unique command for synchronization of the start) to the SDK application. If a communication error occurs between the MFP service and the SDK application, or if no response is received from the SDK application, the MFP service transmits the negotiation start command again after a predetermined time elapses (step 302).

Upon receipt of the negotiation start command, the SDK application transmits as negotiation information its version information together with the machine information received from the MFP main body. When all the information about the negotiation is transmitted, the SDK application transmits a negotiation end command to the MFP service (steps 303 and 304). Upon receipt of the negotiation end command, the MFP service determines that the negotiation has been ended and then proceeds to the next process (step 305).

As to the SDK application necessary for the IT function, an initial file (text file) listing the execution file and the version number of the SDK application is stored in the HDD connected to the IT function. Accordingly, the MFP service can recognize the required version of the SDK application by reading the content of the initial file.

Then, the MFP service reads the initial file of the SDK application to acquire information about the version (step 306) and compares the version thus acquired with the version received at the negotiation (step 307). If these two versions are the same, the MFP service ends the update process of the SDK application without executing further processing.

If the versions are different from each other, the MFP service transmits to the SDK application a request for confirming if it is possible to receive a program (to confirm the status of the recipient so as to transmit a program file) (step 308). Then, the MFP service receives a reply from the SDK application indicating that the reception is possible (step 309). If the SDK application is set to the automatic upgrading (step 310), the MFP service reads out the SDK application from the HDD to start a file transmission process (steps 311 and 312). Note that if the SDK application is set to "no automatic upgrading" in the initial setting, a reply indicative of no upgrading of the SDK application is received from the SDK application. Therefore, the file transmission process is not started. In short, an inconsistent combination between the SDK application and the MFP service is established.

Here, since the version of the SDK application received from the MFP service will not start unless the MFP main body is restarted, it is necessary to restart the MFP main body. Then, the MFP service confirms, based on the command received from the SDK application, whether the MFP main body is turned off according to a user's operation, a system timer, or the like (step 313). If the MFP main body is turned off, the MFP service transmits a restart command to an SCS that manages the MFP main body so as to restart the MFP main body (step 314).

Since the IT function is required to have a corresponding SDK application inside it, it is sometimes necessary to prepare a modified. DVD in which the SDK application is changed even if there is no change in the IT function. However, according to the third embodiment of the present invention, it is possible to upgrade only the version of the SDK application without upgrading the version of the IT function, thereby aiming to reduce the time required for the upgrading.

The present invention is not limited to the specifically disclosed embodiments, and variations and modifications may be made without departing from the scope of the present invention.

What is claimed is:

1. An image processing apparatus having a first block and a second block that expands a function of the first block, wherein
the first block comprises:
an image processing unit configured to perform at least one of image processing functions including an image forming function and an image scanning function;
a basic control unit configured to control the image processing unit as a function initially installed in the image processing apparatus;
a first expansion control unit configured to expand the functions of the image processing apparatus and control the image processing unit; and
a first basic communication unit configured to exchange information at least between the basic control unit and the second block, and
the second block comprises:
a second expansion control unit configured to expand the functions of the image processing apparatus and control the image processing unit;
an operations unit configured to input information and output information associated with the second expansion control unit;
an instruction unit configured to transmit an instruction signal to one of the first basic communication unit and the first expansion control unit via the operations unit;
a second basic communication unit configured to exchange information between the operations unit and the first block, wherein
an operation on the basic control unit and an operation on the first expansion control unit are switched based on the instruction signal transmitted from the instruction unit.

2. The image processing apparatus according to claim 1, further comprising an expansion communication unit that exchanges information between the instruction unit and the first expansion control unit.

3. The image processing apparatus according to claim 2, wherein the expansion communication unit is capable of transmitting a larger amount of information per unit of time than the first and second basic communication units.

4. The image processing apparatus according to claim 1, wherein the operations unit includes a display section that visually displays information and a detection section that detects an operation by a user relative to the display section, displays information corresponding to the basic control unit on the display section when operating the basic control unit, and displays information corresponding to the first expansion control unit on the display section when operating the first expansion control unit.

5. The image processing apparatus according to claim 4, wherein the operations unit acquires the information corresponding to the basic control unit from the basic control unit via the first and second basic communication units and the information corresponding to the expansion control unit from the first expansion instruction unit.

6. The image processing apparatus according to claim 5, wherein, when operating the first expansion control unit, the operations unit overwrites information acquired from the first expansion control unit via the first and second basic communication units with the information corresponding to the first expansion control unit so as to be displayed on the display section.

7. The image processing apparatus according to claim 1, wherein the operations unit includes a voice input section to which voice information is input, and the instruction unit transmits the instruction signal in accordance with voice input to the voice input section.

8. The image processing apparatus according to claim 1, wherein the instruction unit stores operations information to be output in accordance with the operation by a user to the operations unit and information about an instruction signal to be transmitted to the first expansion control unit so as to be associated with each other.

9. A method for controlling an image processing apparatus having a first block and a second block that expands a function of the first block, wherein
the first block comprises:
an image processing unit configured to perform at least one of image processing functions including an image forming function and an image scanning function;
a basic control unit configured to control the image processing unit as a function initially installed in the image processing apparatus;
a first expansion control unit configured to expand the functions of the image processing apparatus and control the image processing unit; and
a first basic communication unit configured to exchange information at least between the basic control unit and the second block, and
the second block comprises:
a second expansion control unit configured to expand the functions of the image processing apparatus and control the image processing unit;
an operations unit configured to input information and output information associated with the second expansion control unit;
an instruction unit configured to transmit an instruction signal to one of the first basic communication unit and the first expansion control unit via the operations unit;
a second basic communication unit configured to exchange information between the operations unit and the first block, wherein
an operation on the basic control unit and an operation on the first expansion control unit are switched based on the instruction signal transmitted from the instruction unit, the method comprising:
confirming a corresponding relationship between the instruction unit and the first expansion control unit when the image processing apparatus performs a starting process; and
making the first expansion control unit correspond to the instruction unit in accordance with a confirmation result of the above step.

10. A non-transitory recording medium having recorded therein a control program, which causes an information processing apparatus to perform the method according to claim 9, in a form readable by the information processing apparatus.

* * * * *